United States Patent [19]

Taya et al.

[11] Patent Number: 5,024,501
[45] Date of Patent: Jun. 18, 1991

[54] MANUFACTURING METHOD FOR POLARIZATION MAINTAINING OPTICAL FIBER COUPLERS

[75] Inventors: Hiroyuki Taya, Sakura; Mikio Yoshinuma, Yachiyo; Takeshi Yamada, Sakaura; Kenji Nishide, Kamakura; Fumio Suzuki, Sanbu; Hirohisa Fujimoto, Yokohama; Ryozo Yamauchi, Sakura, all of Japan

[73] Assignee: Fujikura Ltd., Tokyo, Japan

[21] Appl. No.: 506,402

[22] Filed: Apr. 9, 1990

[30] Foreign Application Priority Data

Apr. 12, 1989 [JP] Japan ................................. 1-92233

[51] Int. Cl.⁵ .......................... G02B 6/02; G02B 6/16; G02B 6/26; C03B 37/06
[52] U.S. Cl. ............................ 350/96.15; 350/96.29; 65/5
[58] Field of Search ............... 350/96.15, 96.20, 96.21, 350/96.29; 65/1, 2, 3, 4, 5, 6

[56] References Cited

U.S. PATENT DOCUMENTS 4,603,941 7/1986 Fujii et al. ...................... 350/96.21
4,911,524 3/1990 Itoh et al. ...................... 350/96.21

FOREIGN PATENT DOCUMENTS 0319041 7/1989 Japan .

*Primary Examiner*—Akm Ullah
*Attorney, Agent, or Firm*—Sprung Horn Kramer & Woods

[57] ABSTRACT

The present invention discloses a manufacturing method for polarization maintaining optical fiber couplers which are used for joining light signals and at optical fiber branch points. The disclosed manufacturing method employs polarization maintaining optical fibers, and describes a method for mutually aligning the stress applying parts of such optical fibers so that polarized optical signals are maintained in the polarized state when transiting such couplers.

9 Claims, 13 Drawing Sheets

θ=90°

ANGLE OF ROTATION(θ)

ANGLE OF ROTATION(θ)

ANGLE OF ROTATION(θ)

ANGLE OF ROTATION(θ)

MANUFACTURING METHOD FOR POLARIZATION MAINTAINING OPTICAL FIBER COUPLERS

BACKGROUND OF THE INVENTION

1. Field of the Invention

The present invention pertains to a manufacturing method for couplers for optical fibers employed in communication systems, data transmission equipment, optical sensors and the like, which are used for joining light signals and at optical fiber branch points.

2. Prior Art

In the past polarization maintaining optical fiber couplers have been manufactured as will be described below. First of all, two component polarization maintaining optical fibers 12A, 12B are mutually aligned side by side so that their longitudinal axes are parallel with respect to one another, and additionally, so that their X-axes 15 are parallel with respect to one another, as is shown in FIG. 1. As can be seen in FIG. 1, each component optical fiber 12A, 12B includes a core 16 and cladding 18 in addition to the above mentioned stress applying parts 14.

Next, as is shown in FIG. 2, a portion of the aligned component optical fibers 12A, 12B is thermally fused, and the fused portion 20 thereby formed is then drawn out to form a fused-elongated region 11 as is shown in FIG. 3, whereby the optical fiber coupler 10 is manufactured.

Conventionally, with such a manufacturing method as described above, in order to mutually align the stress applying parts 14 of each component optical fiber 12A, 12B, a measuring system as is shown in FIG. 4 has been employed. In this measuring system, the component polarization maintaining optical fibers 12A, 12B are immersed in a matching oil having an index of refraction identical to that of the cladding 18 of the component optical fibers 12A, 12B, whereby refraction at the surface of the claddings 18 is eliminated. A light source 24 is placed below the component optical fibers 12A, 12B, and they are then examined from above using a microscope 26.

Since the index of refraction of the stress applying parts 14 differs from that of the claddings 18, the transmitted light from the light source 24 is refracted at the interface of the stress applying parts 14 and the claddings 18, the forms of the stress applying parts can be seen or be observed by the microscope 26. Thus, while under observation, the component optical fibers 12A, 12B are rotated about their longitudinal axes, whereby the stress applying parts 14 are brought into alignment.

With this type of alignment method however, the accuracy of the obtained alignment is very much dependant on the skill of the individual. For those not skilled, there tends to be great variability in the quality of the obtained optical fiber coupler. In the case where angular deviation between the stress applying parts is present in the manufactured optical fiber coupler, cross-talk characteristics suddenly degrade. The relationship between angular deviation of the stress applying parts and cross-talk is shown in FIG. 5. It can be seen from the drawing that in order to limit cross-talk in this type of optical fiber coupler, it is necessary to limit angular deviation as much as possible.

SUMMARY OF THE INVENTION

In view of the above, it is an object of the present invention to provide a manufacturing method for polarization maintaining optical fiber couplers wherein the alignment of the stress applying parts of the component optical fibers can be carried out accurately and easily.

An additional object of the present invention is to provide a manufacturing method for polarization maintaining optical fiber couplers employing component optical fibers having a small refractive index difference between the stress applying parts and the cladding wherein the position of the stress applying parts of the component optical fibers can be accurately and easily measured, and whereby a high efficiency polarization maintaining optical fiber coupler can be manufactured in which excess losses have been greatly reduced.

By conducting a number of experiments, it has been found that by positioning a light source 24 at one side of a polarization maintaining optical fiber 12 and examining the optical fiber from the other side with an image sensor 28 (for example a TV camera) as is shown in FIG. 6, that variation of the obtained image occurs with variation of the position of the stress applying parts 14. Based on the effect of carrying out such an examination, it has been found to be possible to position and align the stress applying parts 14 of polarization maintaining optical fibers 12 with high accuracy while causing the fibers 12 to rotate about their longitudinal axes.

Accordingly, the present invention provides a manufacturing method for polarization maintaining optical fiber couplers characterized by a step in which two polarization maintaining optical fibers 12 are positioned so that the stress applying parts 14 of each are mutually aligned with respect to one another, and a step in which a portion of the optical fibers 12 so aligned are caused to uniformly adhere to one another. In the manufacturing method of the present invention, the above mentioned positioning step is characterized in that, an image is obtained of the light transmitted through the fiber from a light source 24 on one side of the optical fibers with an image sensor 28 positioned on the opposite side, whereby by examining the light intensity distribution of the fiber images thereby obtained while rotating one or both of the component optical fibers 12, the component optical fibers 12 are brought into the desired alignment. Through the above described steps, the need for matching oil when aligning the stressed portions 14 of the component optical fibers 12 is eliminated along with the associated problems described earlier. Thus, with the manufacturing method of the present invention, the alignment process can be simplified, while at the same time, a highly efficient polarization maintaining optical fiber coupler of which the accuracy of alignment of the stress applying parts 14 is improved can be fabricated.

DETAILED DESCRIPTION OF THE PREFERRED EMBODIMENTS

First Preferred Embodiment

In the following section, a first preferred embodimen of the present invention will be explained with reference to FIGS. 6 to 17.

Figure 7:
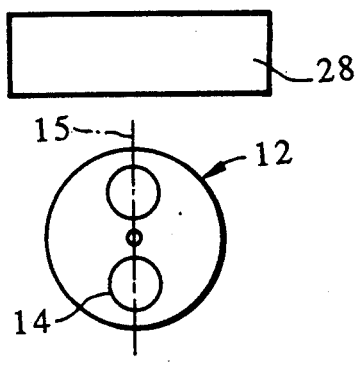
FIG. 7 is a schematic diagram showing an example of the examination method of a first preferred embodiment of the present invention viewed perpendicular to the longitudinal axis of a polarization maintaining optical fiber in which the optical fiber is aligned so that the two stress applying parts contained therein are both coplanar with and perpendicular to the optical axis of a TV camera, and hence overlap with respect to the obtained image.

Using a polarization maintaining optical fiber (hereafter referred to as optical fiber), FIGS. 6 to 14 serve to illustrate one example of the images obtained in the manufacturing method of the first preferred embodiment of the present invention. As shown in FIG. 7, a light source 24 is placed beneath the optical fiber 12 and a TV camera 28 is located above the optical fiber 12, whereby the optical fiber 12 is examined. Depending on the position of stress applying parts 14, the appearance of the obtained image varies.

Figure 1:
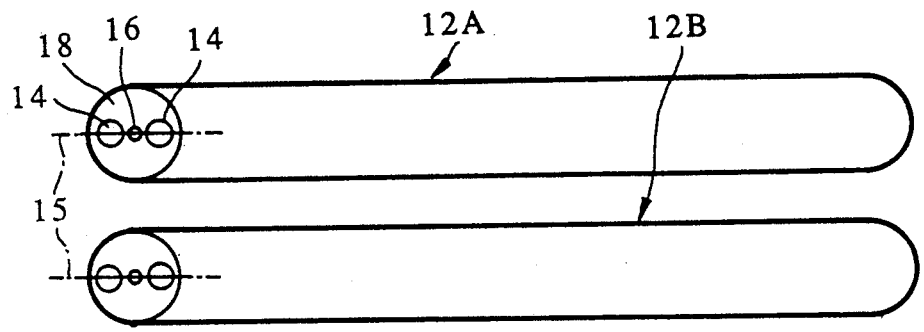
FIGS. 1 through 3 are schematic diagrams illustrating a manufacturing method for polarization maintaining optical fiber couplers.
Figure 2:
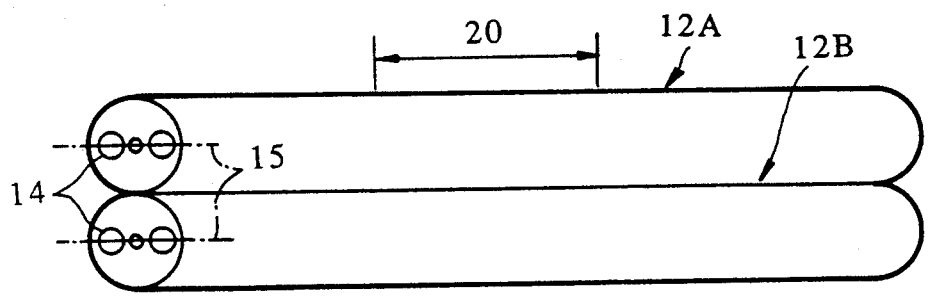
Figure 3:
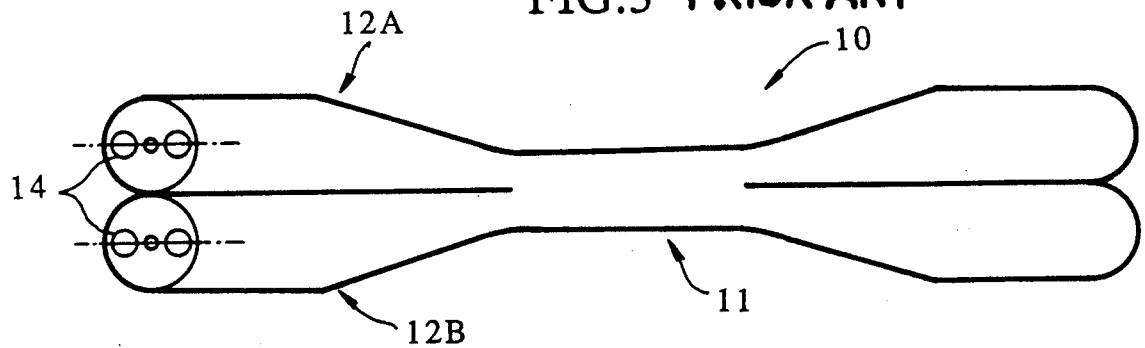
Figure 4:
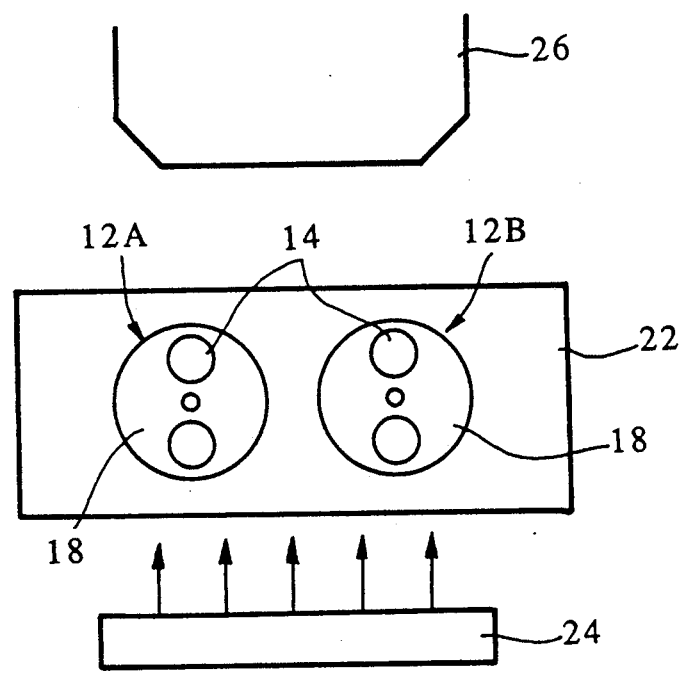
FIG. 4 is a diagram illustrating one example of a conventional method for mutually aligning the stress applying parts of component polarization maintaining optical fibers used in the manufacture of polarization maintaining optical fiber couplers.
Figure 6:
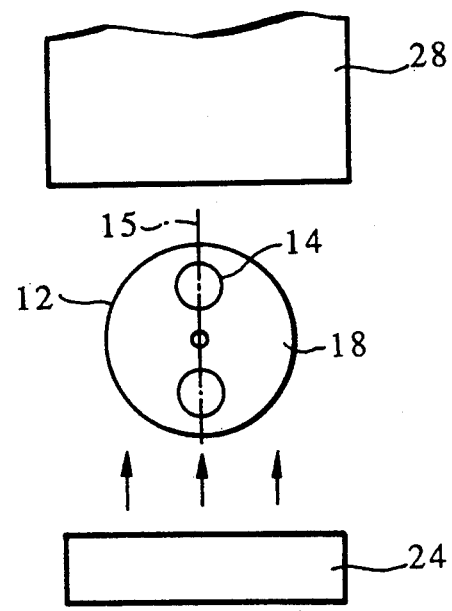
FIG. 6 is a schematic diagram illustrating the method used in the present invention for examining the image of polarization maintaining optical fibers.
Figure 5:
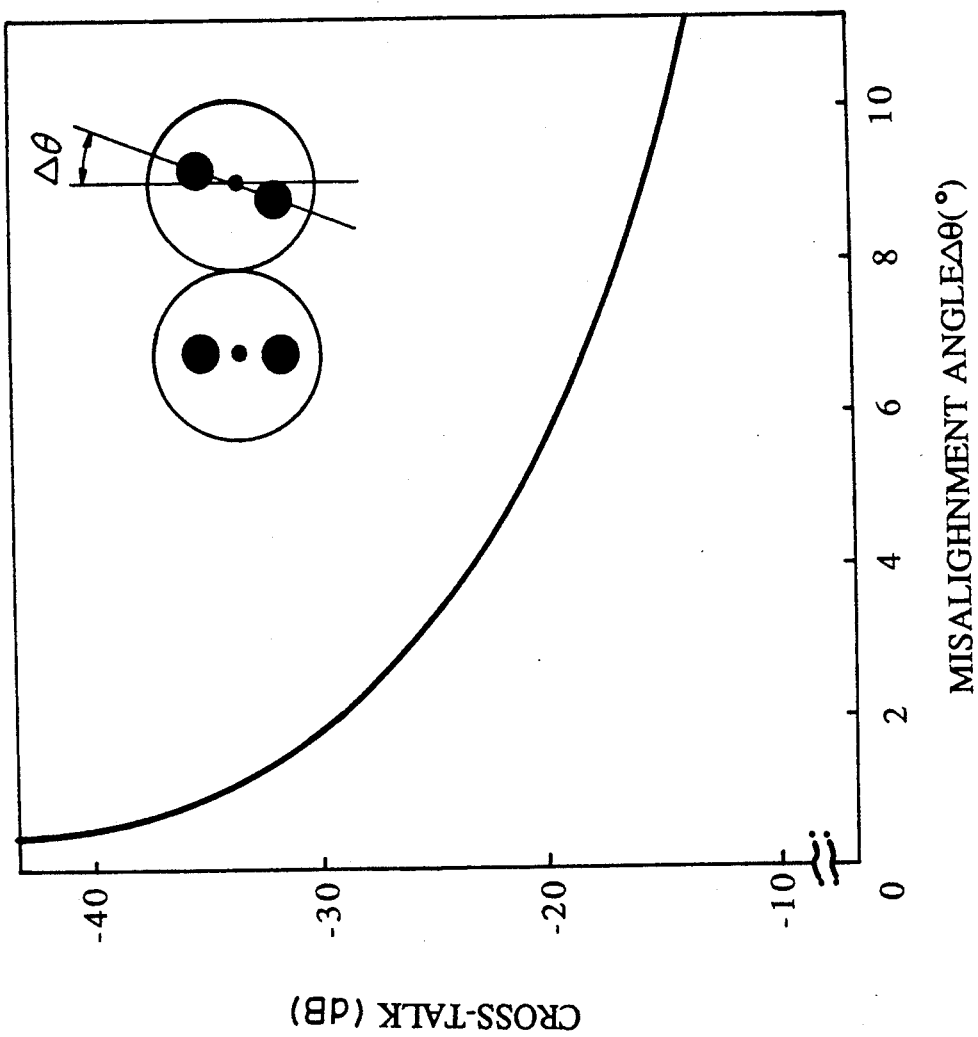
FIG. 5 is a graph showing the relationship between misalignment angle of the stress applying parts and cross-talk.
Figure 9:
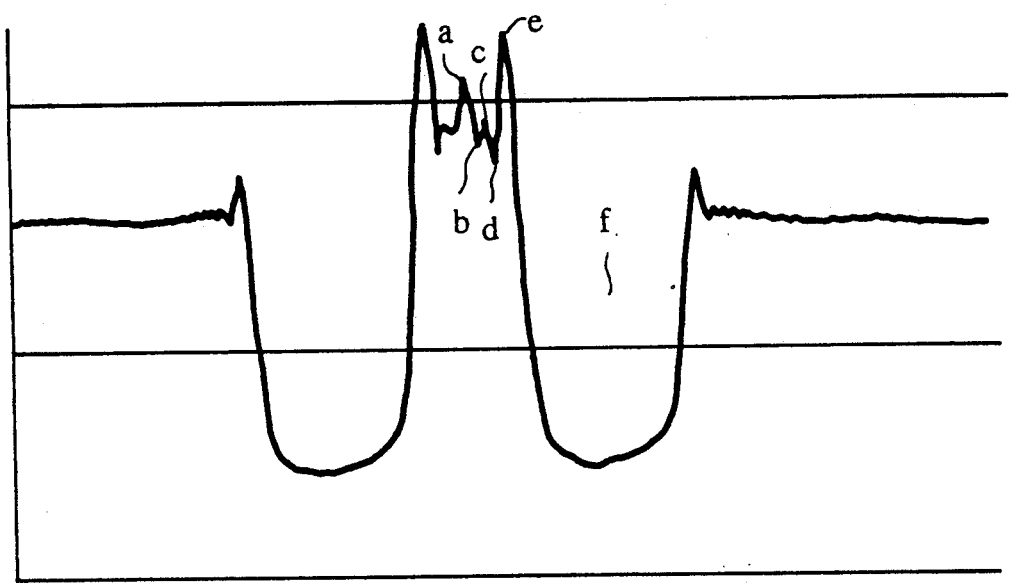
FIG. 9 is a light intensity distribution profile from the polarization maintaining optical fiber in the same orientation as that shown in FIG. 7.
Figure 8:
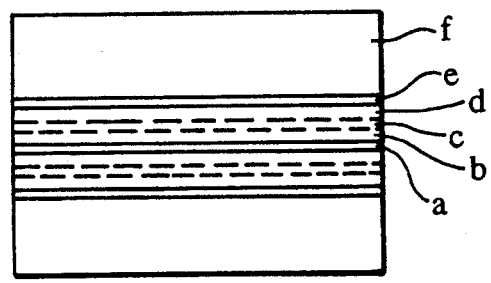
FIG. 8 is a schematic diagram showing the image obtained from the polarization maintaining optical fiber in the same orientation as that shown in FIG. 7.

As shown in FIG. 7, when the optical fiber 12 is examined from the direction of its X-axis 15, the image obtained by Tv camera 28 is as is shown in FIG. 8, and the corresponding light intensity distribution profile is as is shown in FIG. 9. With such an orientation, the obtained image shown in FIG. 8 is characterized in that the core is clearly seen at the center (a). Additionally, proceeding outward from the center (a), there are a series of bands (b) to (f) of varying darkness, the intensities of which are shown graphically in the light intensity distribution profile of FIG. 9. In the above discussion, the X-axis 15 is defined by as perpendicular to the longitudinal axis of the optical fiber 12 and running through the center of both stress applying parts 14 as well as that of the intermediate core.

Figure 12:
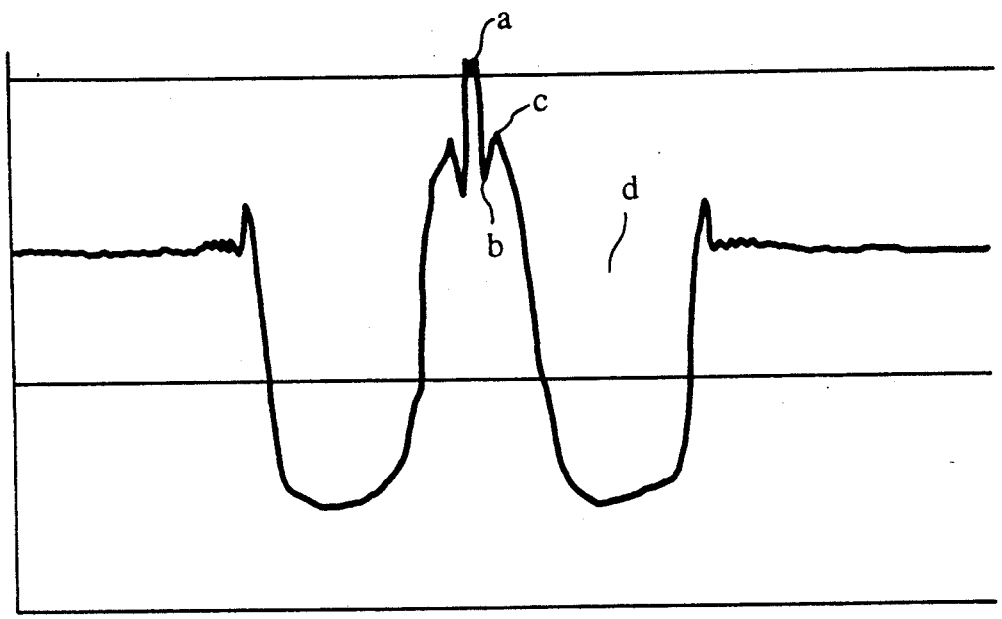
FIG. 12 is a light intensity distribution profile from the polarization maintaining optical fiber in the same orientation as that shown in FIG. 11.
Figure 10:
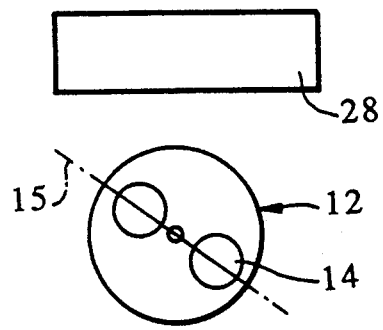
FIG. 10 is the same schematic diagram of FIG. 7 after rotation of the optical fiber 45° around its longitudinal axis.
Figure 11:
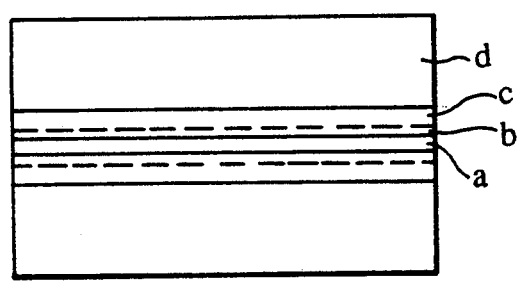
FIG. 11 is a schematic diagram showing the image obtained from the polarization maintaining optical fiber in the same orientation as that shown in FIG. 10.

After rotating the optical fiber 12 around its longitudinal axis so that the X-axis 15 comes to form an angle of 45° with the optical axis of TV camera 28, the configuration shown in FIG. 10 is reached. The corresponding image obtained by TV camera 28 and light intensity distribution profile are shown in FIGS. 11 and 12 respectively. In this orientation as well, the obtained image shown in FIG. 11 is characterized in that the core is clearly seen at the center (a). In this case, proceeding outward from the center (a), there are a series of bands (b) to (d) of varying darkness, the intensities of which are again shown graphically in the light intensity distribution profile of FIG. 12.

Figure 13:
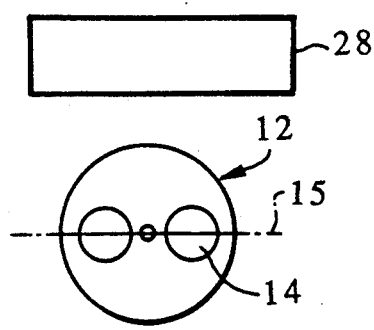
FIG. 13 is the same schematic diagram of FIG. 7 after rotation of the optical fiber 90° around its longitudinal axis so that the two stress applying parts contained therein both lie in a plane perpendicular to the optical axis of the TV camera.

After again rotating the optical fiber 12 around its longitudinal axis so that the X-axis 15 comes to form an angle of 90° with the optical axis of TV camera 28, the configuration shown in FIG. 13 is reached. The corresponding image obtained by TV camera 28 light intensity distribution profile in FIGS. 13 and 14 respectively. Again, in the obtained image shown in FIG. 11, the core is clearly seen at the center (a). In this case, proceeding outward from the center (a), there are a series of bands (b) to (e) of varying darkness, the intensities of which are shown graphically in the light intensity distribution profile of FIG. 15.

In this first preferred embodiment of the present invention, using the above described optical fiber image inspection method, two component optical fibers 12 are aligned with respect to each other so that both their respective longitudinal axes and X-axes 15 are parallel.

Figure 16:
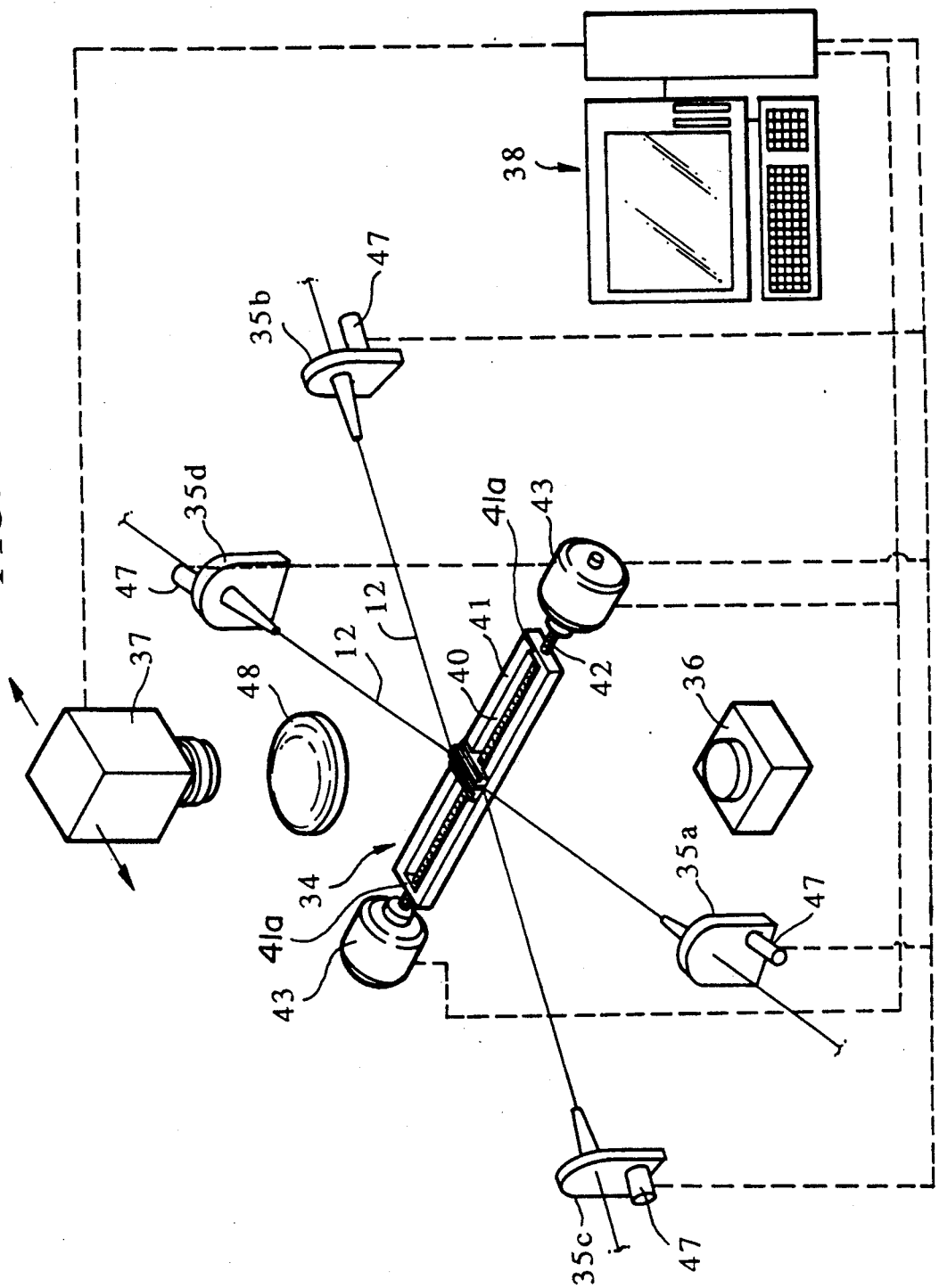
FIG. 16 is a schematic diagram of an alignment apparatus used for positioning stress applying parts in the manufacturing method of the present invention.

In FIG. 16, one example of a suitable fiber alignment apparatus is shown. In the illustration, an approximation device 34 is shown, wherein at the start of the procedure, a portion from each of the 2 component optical fibers 12 from which the protective coating has been removed is positioned so that the two exposed portions lie side by side in close proximity so that their longitudinal axes are parallel with respect to one another. Four fiber rotation devices 35a, 35b, 35c, 35d are provided, with fiber rotation devices 35a and 35d provided for rotating one of the component optical fibers 12, and fiber rotation devices 35b and 35d provided for rotating the other of the component optical fibers 12. In this way, one of the component optical fibers 12 can be rotated about its longitudinal axis by means of the pair of fiber rotation devices 35a and 35d, and the other component optical fiber 12 can be rotated about its longitudinal axis by means of the other pair of fiber rotation devices 35b and 35c.

Figure 17:
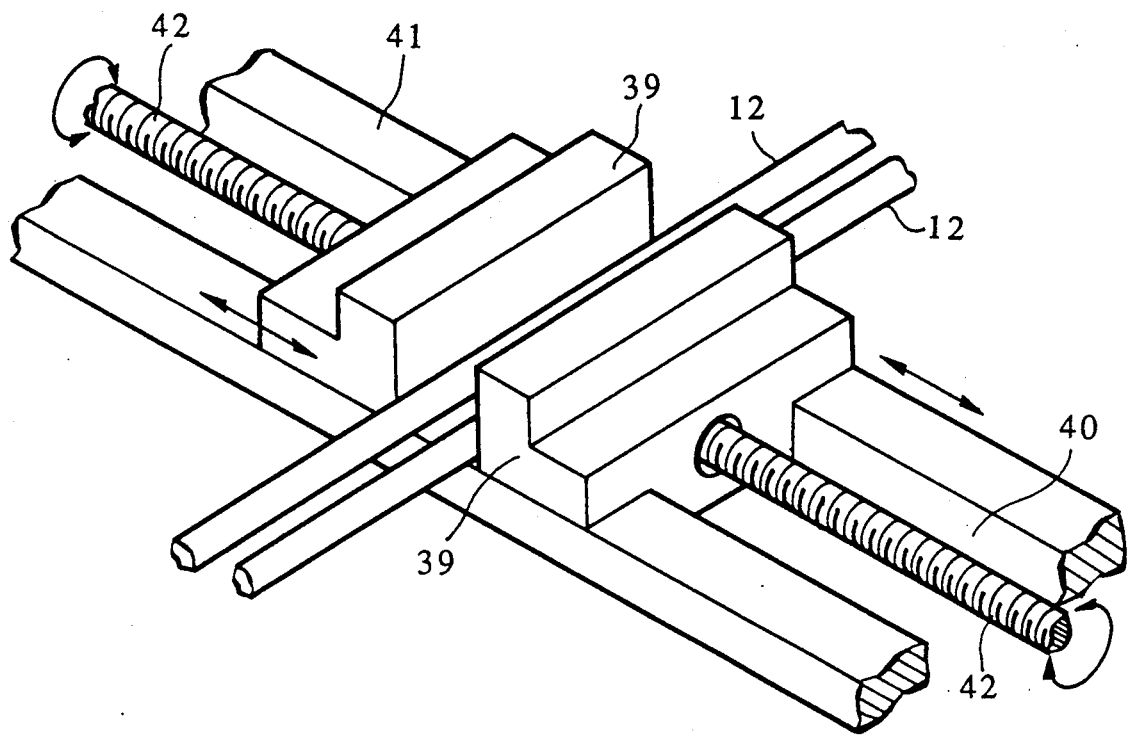
FIG. 17 and 18 are oblique views showing the essential components of the alignment apparatus shown in FIG. 16.

An oblique view showing approximation device 34 in more detail can be seen in FIG. 17. In this drawing, a pair of linearly movable lateral force applying blocks 39 are shown, whereby, as described above, the respective exposed portions of each component optical fiber 12 are caused to lie side by side in close proximity so that their longitudinal axes are parallel with respect to one another. Both of the lateral force applying blocks 39 are provided on a pair of elongated rails 41, along which the lateral force applying blocks 39 are slidably movable in a linear orientation which is perpendicular to the longitudinal axes of the component optical fibers 12 lying therebetween. An elongated guiding space 40 is formed between a pair of elongated rails 41, in which a pair of elongated drive screw rods 42, each corresponding to a respective lateral force applying block 39, are provided so as to lie along the central axis between and parallel to the pair of rails 41. At both ends of the pair of rails 41, a cross-piece 41a is provided, each of which is threaded so as to engage the threads of a respective drive screw rod 42.

As shown in FIG. 17, one end of each of the drive screw rods 42 is connected with a respective lateral force applying block 39 so as to be freely rotatable. As shown in FIG. 16, the opposite end of each of the drive screw rods 42 is connected with a respective pulse motor 43. When the pulse motors 43 rotate in a clockwise direction, each respective drive screw rod 42 is driven centrally as it rotates by virtue of the engagement of its threads with the threads of a respective cross-piece 41a. When the pulse motors 43 rotate in a counter-clockwise direction, the converse is true. Thus, by means of the above described action, when the pulse motors 43 rotate in a clockwise direction, their respective lateral force applying blocks 39 move centrally along the pair of rails 42 and thus approach each other, and when the pulse motors 43 rotate in a counter-clockwise direction, their respective lateral force applying blocks 39 move peripherally and thus move apart. For the above mentioned pulse motors 43, a fine rotation gradient type having on the order of one revolution per 2000 pulses is preferable. For the above mentioned drive screw rods 42, a pitch of on the order of 0.2 mm is preferable, whereby the position of the lateral force applying blocks 39 can be controlled with a tolerance of less than 1 μm.

Figure 18:
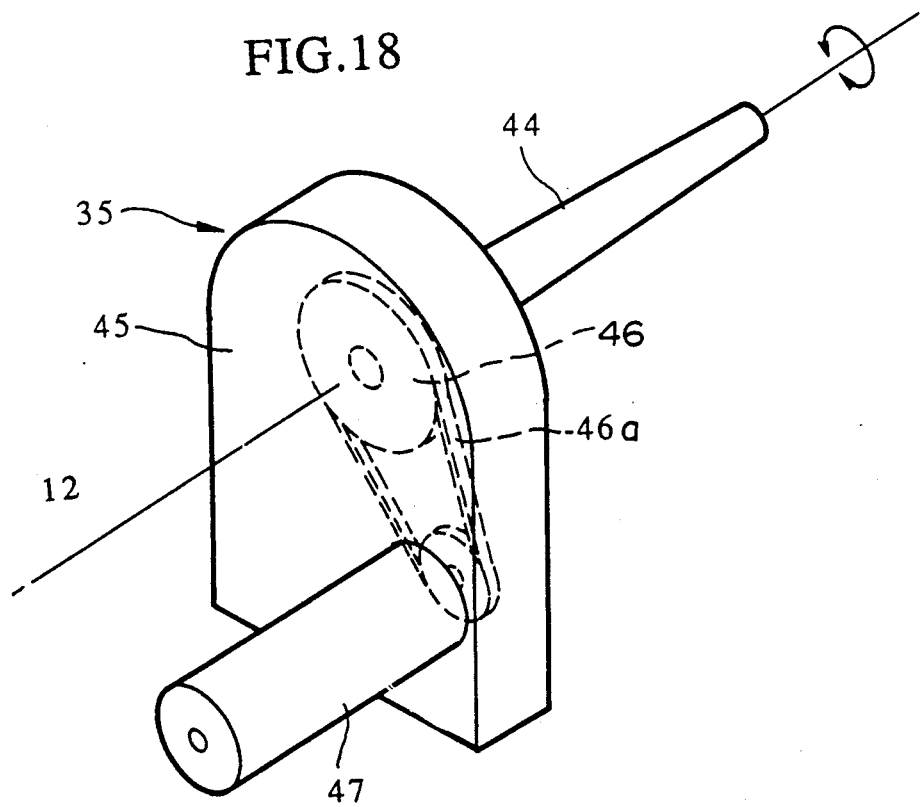

An oblique view showing one of the above mentioned fiber rotation devices 35a-35d can be seen in greater detail in FIG. 18. Each fiber rotation device 35 includes a frame 45 in which a hollow guiding portion 44 is provided through which a component optical fiber 12 passes. The optical fiber 12 passing through frame 45 via guiding portion 44 is clasped by a fiber support unit 46 by means of which the fiber can be caused to rotate around its longitudinal axis. A drive shaft of a respective pulse motor 47 passes into the frame 45, in which it engages with the respective fiber support unit 46 via a belt 46a, by means of which the above described rotation of optical fiber 12 can be realized. Thus an optical fiber 12 passes through and is clasped by a respective pair of rotation devices, rotation devices 35a, 35d or rotation devices 35b, 35c, whereby through synchronous rotation of the respective pulse motor 47 of each member of the pair of rotation devices, rotation of the respective optical fiber 12 in a fixed direction about its longitudinal axis is achieved. For the above mentioned pulse motors 47, a fine rotation gradient type having on the order of one revolution per 2000 pulses is preferable. For the belts 46a, a conversion ratio of on the order of 2:1 is preferable. With such pulse motors 47 and belts 46a, a high rotational accuracy of on the order of 0.090° per pulse is obtainable.

After a pair of component optical fibers 12 from which the protective coating has been removed from a portion of each are each fixed in a respective pair of rotation devices, rotation devices 35a, 35d or rotation devices 35b, 35c, and the exposed portions of the two optical fibers 12 are located between the pair of lateral force applying blocks 39, the exposed sections are then illuminated from below by a light source 36, for example a halogen lamp, located beneath the pair of lateral force applying blocks 39. Above the pair of lateral force applying blocks 39, a transparent heat shield 48 formed of quartz glass or the like is provided, above which a TV camera 37 is provided, whereby the image of the light transmitted through the optical fibers 12 is captured.

The image signal from TV camera 37 is then sent to control unit 38. Control unit 38 is comprised of a image processing unit by means of which the video signal from TV camera 37 is processed, and a motor control unit by means of which, based on the signal supplied from the image processing unit, the direction, amount, and velocity of rotation of each of the two pulse motors 43 of approximation device 34 and the respective pulse motors 47 of each rotation device 35 are controlled.

Next, the pulse motors 47 are controlled to rotate so that the portion of the obtained image corresponding to each optical fiber 12 is identical, and so that the corresponding light intensity distribution profile is the same as that shown in FIG. 9. At the point when the light intensity distribution profile for each optical fiber 12 is the same as that shown in FIG. 9, the pulse motors 47 are stopped. Then the pulse motors 43 are controlled to rotate so that the lateral force applying blocks 39 approach one another.

Both the control of the pulse motors 47 whereby the optical fibers 12 are aligned and the control of pulse motors 43 whereby the optical fibers 12 are brought into proximity can be carried out automatically through the motor control unit of control unit 38.

After the above described alignment and approximation of the optical fibers 12 is carried out, the mutual position relationship of the two optical fibers 12 is fixed by causing the optical fibers 12 to adhere to one another, thus obtaining a temporary fixing. This may be achieved, for example, by applying a drop of an adhesive, or by partially fusing the optical fibers 12 by heating lightly using a microburner.

With the optical fibers 12 thus temporarily fixed, a fusing-elongation process is next carried out. While carrying out this fusing-elongation process, a laser light is caused to be incident on one end of one of the component optical fibers 12, while at the same time, the light output of the opposite ends of both optical fibers 12 is measured, whereby the coupling ratio between the two optical fibers can be determined. In this way, by heating and applying longitudinal tension to the above formed temporarily fixed region, fusing-elongation can be carried out controlled in such a way that the polarization maintaining optical fiber coupler thereby manufactured has a desired optical coupling ratio.

With the polarization maintaining optical fiber coupler manufacturing method of the present preferred embodiment, the need for matching oil is eliminated, and it becomes possible to simply and efficiently manufacture a polarization maintaining optical fiber coupler having a precisely controlled coupling ratio. Moreover by employing computerized control in the above described optical fiber alignment process, it is possible to accurately and automatically carry out the alignment process.

First Experimental Example

Using polarization maintaining optical fiber material having a protective coating external diameter of 250 μm, a cladding diameter of 80 μm, a core diameter of 4 μm, stress applying parts having a diameter of 20 μm, a stress applying part-cladding refractive index difference of −0.7%, and a cross-talk of −45 dB/5 m, the protective coating was removed from a section of each of two such component optical fibers. The exposed portions of the two component optical fibers were then placed between the lateral force applying blocks of an alignment apparatus such as that shown in FIG. 16.

In regard to the alignment apparatus, the pressing surface of the lateral force applying blocks had a width of 15 mm and a height of 10 mm. The drive screw rods had a pitch of 0.2 mm. The pulse motors of the approximation device as well as those of the rotation devices all had a response ration of 2000 pulses per revolution. The light source was a 100 W halogen lamp. The heat shield was a quartz plate having a thickness of 2 mm. The TV camera was a monochrome TV camera having a 10× objective lens and a 2.5× eye lens (and thus a composite magnification of 25×), and a image field of approximately 300 μm diameter. The control unit was based on a deviation analyzer produced by Hamamatsu Photonics, the output of which was supplied to the respective pulse motors via a sequence controller.

Figure 14:
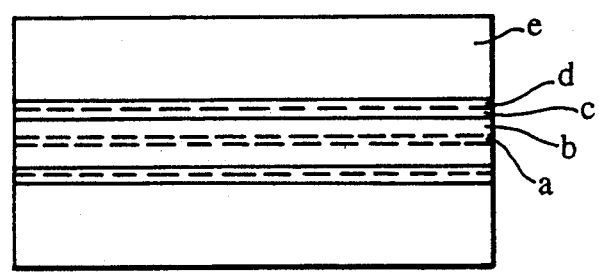
FIG. 14 is a schematic diagram showing the image obtained from the polarization maintaining optical fiber in the same orientation as that shown in FIG. 13.

Concerning the imaging processing unit portion of the above mentioned control unit, here the portions of the obtained image corresponding to the two component optical fibers were analyzed in terms of the light intensity distribution profiles shown in FIGS. 8, 11 and 14, whereby the pulse motors 47 were controlled to rotate to achieve the light intensity distribution profile shown in FIG. 9, thereby attaining the desired alignment. The component optical fibers were then brought into tight contact between the pair of lateral force applying blocks, after which, lightly heating with a microburner, the two aligned, tightly contacting lengths of optical fiber were temporarily fixed. Next, the temporarily fixed optical fibers were removed from the alignment apparatus, after which the temporarily fixed portion was formed into a fused-elongated type optical fiber coupler using conventional techniques.

On measurement of the optical characteristics of the polarization maintaining optical fiber coupler obtained above, it was found that excess losses were 0.8 dB and cross-talk was −37 dB. From this it could be understood the stress applying parts were aligned within a tolerance of less than one degree.

Second Preferred Embodiment

In the following section, a second preferred embodiment of the present invention will be explained with reference to FIGS. 19 to 24.

In regard to polarization maintaining optical fiber couplers, one important characteristic entails excess losses. In order to decrease the excess losses in such optical fiber couplers, it is necessary that the index of refraction of the stress applying parts be as close as possible to that of the cladding of the optical fiber. The reason being, when the optical fibers are drawn out in the manufacture of the fused-elongated region, the diameters of their respective cores are reduced, which leads to leakage of energy from the core through the cladding when light is transmitted through the core. Under these circumstances, if portions of the optical fiber exist having an index of refraction differing from that of the cladding, a leakage mode is generated for those parts, which leads to increased losses.

In order to limit excess losses, methods exist for employing optical fibers having an index of refraction for the cladding which is in proximity to that of the stress applying parts. This kind of polarization maintaining optical fiber is fabricated using a material of which the $SiO_2$ has been doped with $B_2O_3$ and $GeO_2$ for the stress applying parts.

Figure 15:
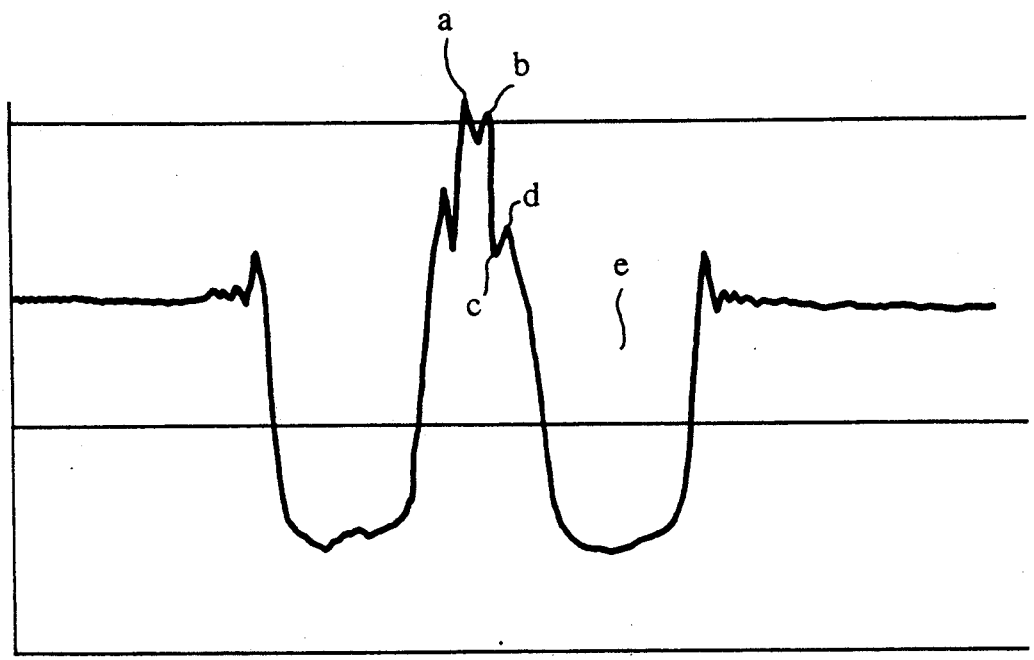
FIG. 15 is a light intensity distribution profile from the polarization maintaining optical fiber in the same orientation as that shown in FIG. 14.
Figure 20:
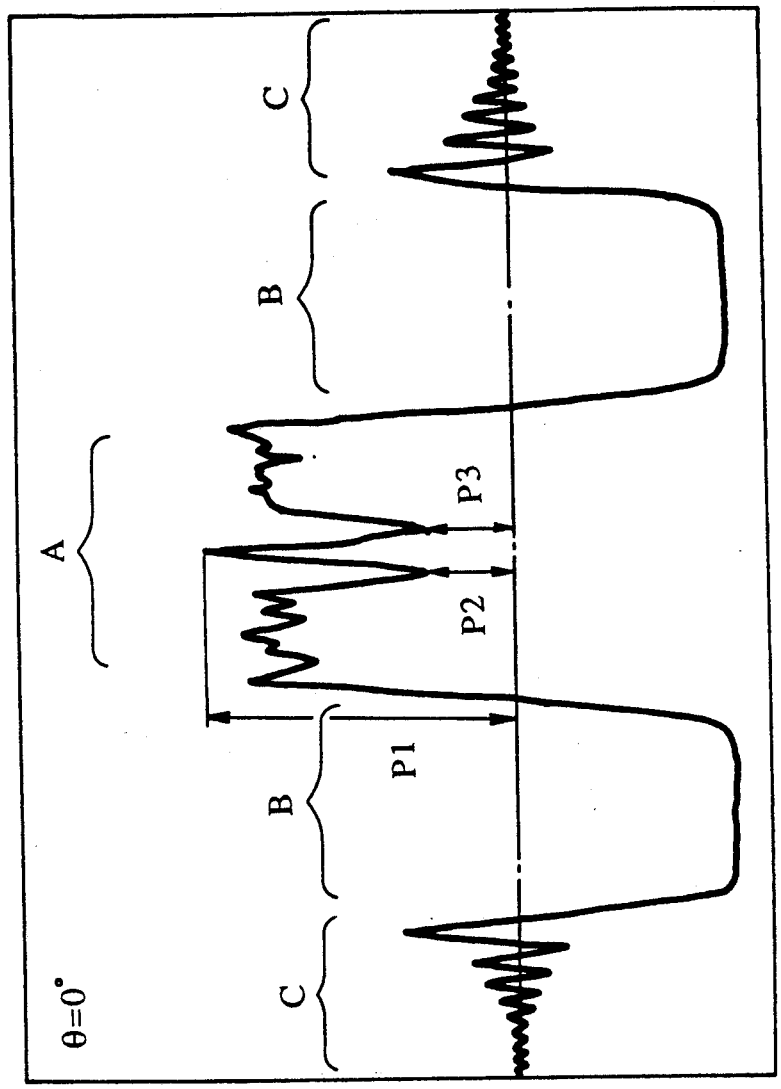
FIG. 20 is a light intensity distribution profile from the polarization maintaining optical fiber in the same orientation as that shown in FIG. 19.
Figure 22:
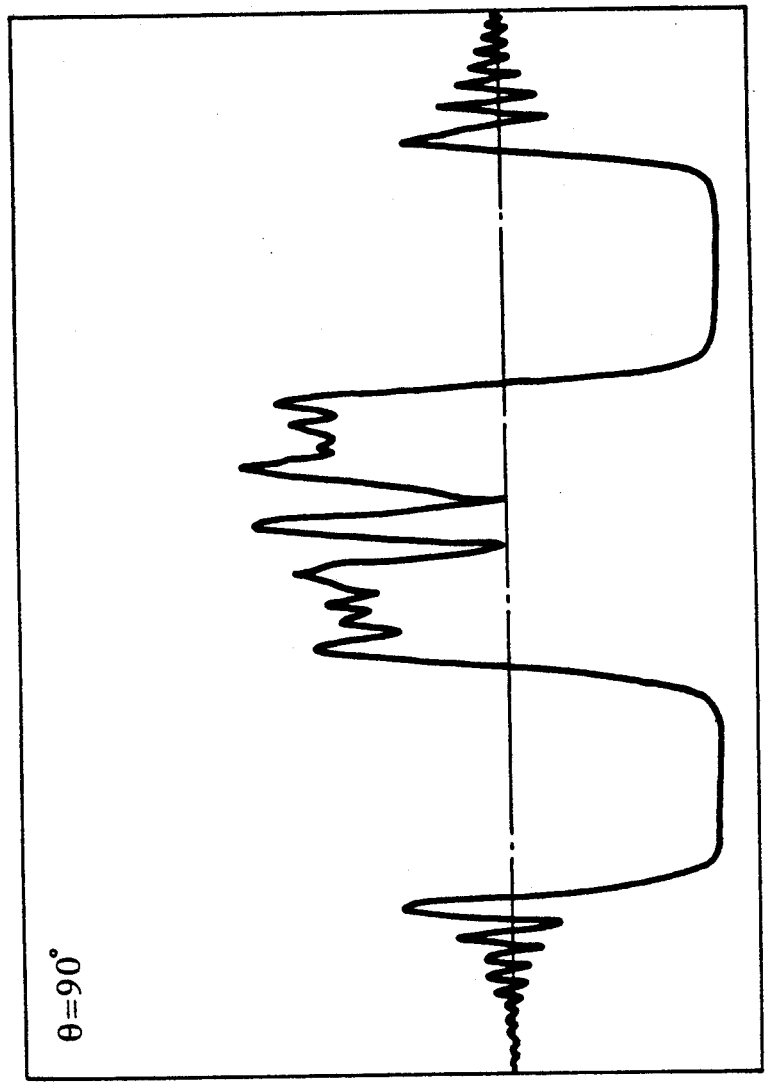
FIG. 22 is a light intensity distribution profile from the polarization maintaining optical fiber in the same orientation as that shown in FIG. 22.

However, with the type of optical fiber material described in the preceding paragraph, the light intensity distribution profile obtained on inspection does not have the characteristics as are shown in the light intensity distribution profiles of FIGS. 9, 12 and 15, but rather, has the characteristics shown in FIGS. 20 and 22. As can be seen, the light intensity distribution profiles of FIGS. 20 and 22 are not strikingly different. For that reason, when manufacturing polarization maintaining optical fiber couplers employing this type of optical fiber material, difficulties arise in accurately measuring the position of the stress applying parts.

As was the case with the first preferred embodiment as shown in FIG. 7, the above mentioned light intensity distribution profiles are obtained using a light source placed beneath the optical fiber 30 and a TV camera located above the optical fiber 30, whereby the optical fiber 30 is examined. Depending on the position of stress applying parts 32, the appearance of the obtained image varies.

Figure 19:
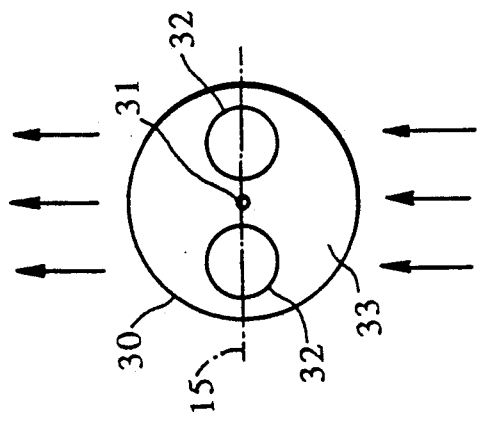
FIG. 19 is a schematic diagram showing an example of the examination method of a second preferred embodiment of the present invention viewed perpendicular to the longitudinal axis of a polarization maintaining optical fiber in which the optical fiber is aligned so that the two stress applying parts contained therein both lie in a plane perpendicular to the optical axis of the TV camera.

The present preferred embodiment concerns a manufacturing method for polarization maintaining optical fiber couplers employing the above type of optical fiber material of which the index of refraction of the cladding is close to that of the stress applying parts. As shown in FIG. 19, the employed polarization maintaining optical fiber 30 is composed of a core 31, two stress applying parts 32, one each located on either side of core 31, and cladding 33 surrounding the previously mentioned components. For the polarization maintaining optical fiber 30 shown, the stress applying part-cladding refractive index difference is on the order of −0.4%.

Figure 21:
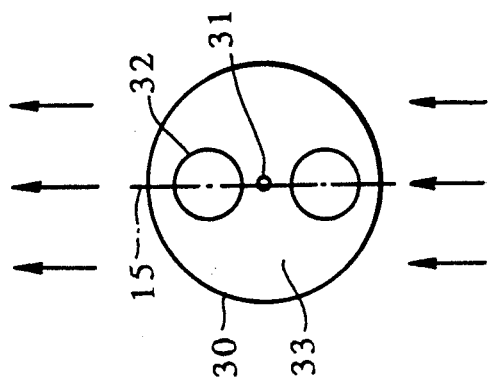
FIG. 21 is the same schematic diagram of FIG. 19 after rotation of the optical fiber 90° around its longitudinal axis so that the two stress applying parts contained therein are both coplanar with and perpendicular to the optical axis of a TV camera, and hence overlap with respect to the obtained image.

As shown in the accompanying FIG. 19, the light intensity distribution profile of FIG. 20 corresponds to the situation where the optical fiber 30 is examined from the direction perpendicular to its X-axis 15 (hereafter this orientation is referred to as angle of rotation $\theta = 0°$), while as shown in the accompanying FIG. 21, the light intensity distribution profile of FIG. 22 corresponds to the situation where the optical fiber 30 is examined from the direction of its X-axis 15 (hereafter this orientation is referred to as angle of rotation $\theta = 90°$). In the above discussion, the X-axis 15 is defined by as perpendicular to the longitudinal axis of the optical fiber 30 and running through the center of both stress applying parts 32 as well as that of the intermediate core 31.

Examining the light intensity distribution profiles shown in FIG. 20, it can be seen that a C region exists at the far right and far left, corresponding to the area in the obtained image external to the optical fiber 30. These C regions represent interference patterns resulting from refraction of light from the light source at the surface of the optical fiber 30. Central to each of the left and right C regions are a left and right B region, which chiefly represents a lens effect of the optical fiber 30, whereby the light from the light source is directed centrally, resulting in the fact that these regions are the darkest. The central A region is the brightest and is the result of converging light from the light source which has passed through the surfaces of the optical fiber 30 and concentrated centrally. The tallest peak P1 lies at the central portion of the A region. Flanking P1 at both the left and the right are somewhat darker portions, P2 and P3 respectively.

As shown in FIGS. 20 and 22, when inspecting the light intensity distribution profile of transmitted light from the light source for an optical fiber 30 of which the index of refraction of the stress applying parts 32 is close to that of the cladding 33, compared with the light intensity distribution profile of an conventional polarization maintaining optical fiber 12, remarkable changes are not seen on rotation of the fiber. By carrying out a detailed study of the changes in the light intensity distribution profile seen on rotation of the optical fiber 30, it has been found that the intensity of peak P1 in the A region varies with the angle of rotation $\theta$. The relation between the intensity of the peak P1 and the angle of rotation $\theta$ is shown in the graph of FIG. 23.

Figure 23:
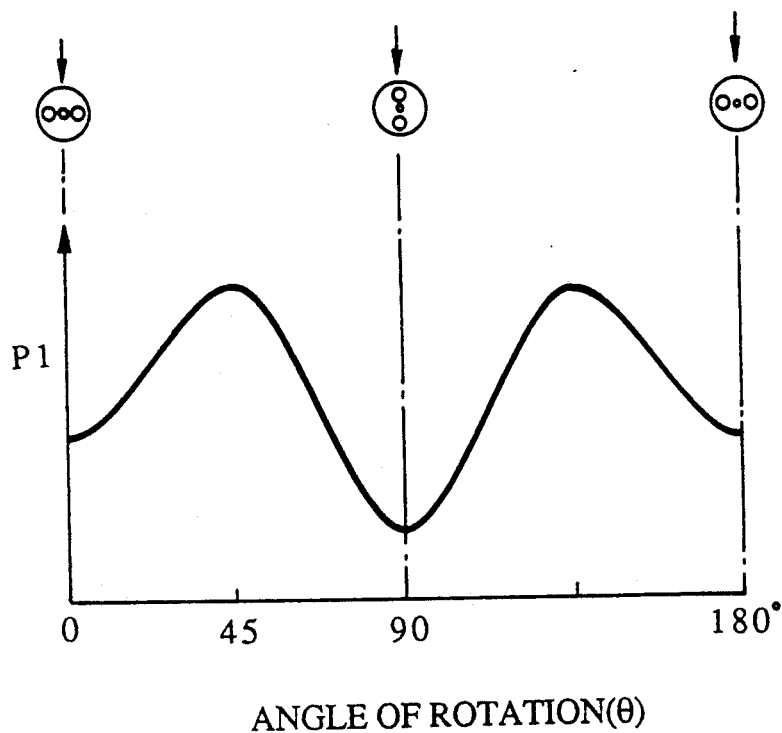
FIG. 23 is a graph showing the relationship between the angle of rotation and height of the tallest peak in the light intensity distribution profiles obtained while rotating a single polarization maintaining optical fiber about its longitudinal axis.

As shown in FIG. 23, at values of $\theta = 0°$, $\theta = 90°$ and $\theta = 180°$ for the angle of rotation, the intensity of P1 reaches a nadir, with $\theta = 90°$ being lower than $\theta = 0°$ or $\theta = 180°$. The highest intensity values for P1 are reached at $\theta = 45°$ and $\theta = 135°$. From these observations, it can be seen that it is possible to measure the position of the optical fiber 30 based on the intensity of peak P1.

Figure 24:
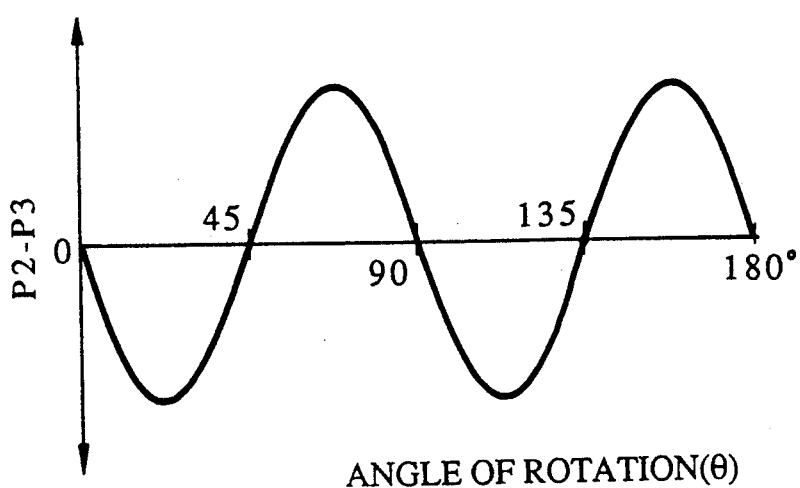
FIG. 24 is a graph showing the relationship between the angle of rotation and difference height of the in the two lowest troughs in the light intensity distribution profiles obtained while rotating a single polarization maintaining optical fiber about its longitudinal axis.

Moreover, by determining the difference between the two lowest light intensity points in the A region, P2 and P3, while rotating the optical fiber 30, the effect shown in the graph of FIG. 24 can be seen to occur. That is, P2-P3 becomes zero at $\theta = 0°$, $\theta = 45°$, $\theta = 90°$, $\theta = 135°$, and $\theta = 180°$.

Determining the position of the optical fiber 30 based only on the difference between P2 and P3 is rather difficult. However, by combining this method with the method based on the intensity of peak P1, the position of the rotating optical fiber 30 can be determined with high accuracy.

The above described positioning of an optical fiber 30 based on the intensity of peak P1 and the difference between P2 and P3 may be readily applied to the manufacture of polarization maintaining optical fiber couplers using the alignment apparatus shown in FIG. 16. Thus, after a pair of component optical fibers 30 from which the protective coating has been removed from a portion of each are each fixed in a respective pair of rotation devices, rotation devices 35a, 35d or rotation devices 35b, 35c, and the exposed portions of the two optical fibers 12 are located between the pair of lateral force applying blocks 39, the exposed sections are then illuminated from below by a halogen lamp light source 36 located beneath the pair of lateral force applying blocks 39. The image of the light transmitted through the optical fibers 30 is then captured by the TV camera 37 located above the pair of lateral force applying blocks 39.

Then, just as in the first preferred embodiment, while the image signal from TV camera 37 is sent to control unit 38, the pulse motors 47 are controlled to rotate at low velocity. In the case of the present embodiment, this control is based on the intensity of peak P1 in the portions of the obtained image corresponding to each of the component optical fibers 30, or on both the intensity of peak P1 and the difference between P2 and P3 in the portions of the obtained image corresponding to each of the component optical fibers 30. In this way, when each of the component optical fibers 30 are judged to be at $\theta = 90°$, that is, at the point where P1 is at its lowest value and where P2-P3 equals zero, the rotation of the optical fibers 30 is stopped, after which the pulse motors 43 are controlled to rotate so that the lateral force applying blocks 39 approach one another.

Both the control of the pulse motors 47 whereby the stress applying parts 32 of optical fibers 30 are aligned and the control of pulse motors 43 whereby the optical fibers 30 are brought into proximity can be carried out automatically through the motor control unit of control unit 38.

After the above described alignment and approximation of the optical fibers 30 is carried out, the mutual position relationship of the two optical fibers 30 is fixed by causing the optical fibers 30 to adhere to one another, thus obtaining a temporary fixing. This may be achieved, for example, by applying a drop of an adhesive, or by partially fusing the optical fibers 30 by heating lightly using a microburner.

With the optical fibers 30 thus temporarily fixed, a fusing-elongation process is next carried out. While carrying out this fusing-elongation process, a laser light source is caused to be incident on one end of one of the component optical fibers 30, while at the same time, the light output of the opposite ends of both optical fibers 30 is measured, whereby the coupling ratio between the two optical fibers can be determined. In this way, by heating and applying longitudinal tension to the above formed temporarily fixed region, fusing-elongation can be carried out controlled in such a way that the polarization maintaining optical fiber coupler thereby manufactured has a desired optical coupling ratio.

With the polarization maintaining optical fiber coupler manufacturing method of the present preferred embodiment, based on the light intensity distribution profile of the image obtained of light passing through the optical fibers 30 from the side whereby the intensities of the peaks P1 and/or the differences between P2 and P3 for each of the component optical fibers 30 are measured while the optical fibers 30 rotate, it becomes possible to easily and with high accuracy align the stress applying parts 32 of component optical fibers 30 of which the difference in index of refraction for the stress applying parts 32 is quite close to that of the cladding 33. By employing such a manufacturing method for polarization maintaining optical fiber couplers using component optical fibers 30 of which the difference in index of refraction for the stress applying parts 32 is close to that of the cladding 33, it is thereby possible to manufacture high efficiency polarization maintaining optical fiber couplers for which the excess losses are low.

Second Experimental Example

Using polarization maintaining optical fiber material having a protective coating external diameter of 250 μm, a cladding diameter of 80 μm, a core diameter of 4 μm, stress applying parts having a diameter of 20 μm, a stress applying part-cladding refractive index difference of −0.4%, and a cross-talk of 45 dB/5 m, the protective coating was removed from a section of each of two such component optical fibers. The exposed portions of the two component optical fibers were then placed between the lateral force applying blocks of an alignment apparatus such as that shown in FIG. 16.

Image processing by the imaging processing unit portion of the control unit was carried out so that the portions of the obtained image corresponding to the two component optical fibers were analyzed in terms of the light intensity distribution profiles shown in FIGS. 20 and 22. In this way, the pulse motors 47 were controlled to rotate based on calculations of the intensities of the peaks P1 and the differences between P2 and P3 for each of the component optical fibers, whereby both optical fibers were aligned at $\theta = 90°$. The component optical fibers were then brought into tight contact between the pair of lateral force applying blocks, after which, lightly heating with a microburner, the two aligned, tightly contacting lengths of optical fiber were temporarily fixed. Next, the temporarily fixed optical fibers were removed from the alignment apparatus, after which the temporarily fixed portion was formed into a fused-elongated type optical fiber coupler using conventional techniques.

On measurement of the optical characteristics of the polarization maintaining optical fiber coupler obtained above, it was found that excess losses were 0.8 dB and cross-talk was −36 dB. From this it could be understood the stress applying parts were aligned within a tolerance of less than one degree.

Third Preferred Embodiment

In the following section, a third preferred embodiment of the present invention will be explained with reference to FIGS. 25 to 27.

In method of the above second preferred embodiment of the present invention, by examining the light intensity distribution profile of the image obtained of light passing through the optical fibers 30 from the side, the intensities of the peaks P1 and the differences between P2 and P3 for each of the component optical fibers 30 were measured while the optical fibers 30 rotated, whereby it was possible to align the stressed portions of the two component optical fibers 30 with high accuracy. With such a method a stress applying part-cladding refractive index difference of −0.2%, and more preferably, on the order of −0.4% to −0.8% is efficacious.

In order to manufacture an even more efficient polarization maintaining optical fiber coupler with lower excess losses, it is necessary to bring the index of refraction of the stressed portions 32 and the cladding 33 into near conformity. However, with a stress applying part-cladding refractive index difference within −0.2% to 0%, for example −0.1%, the variation in the intensity of peak P1 and the difference between P2 and P3 becomes small, as is shown in FIGS. 25 and 26. Thus, the introduction of alignment errors becomes more likely which such a component optical fiber 30.

This third preferred embodiment of the present invention provides a method characterized in that it is possible to align the stress applying parts 51 of two component optical fibers 50 having a stress applying part-cladding refractive index difference ($\Delta$) of in the range of $-0.2\% < \Delta < 0\%$.

Figure 27:
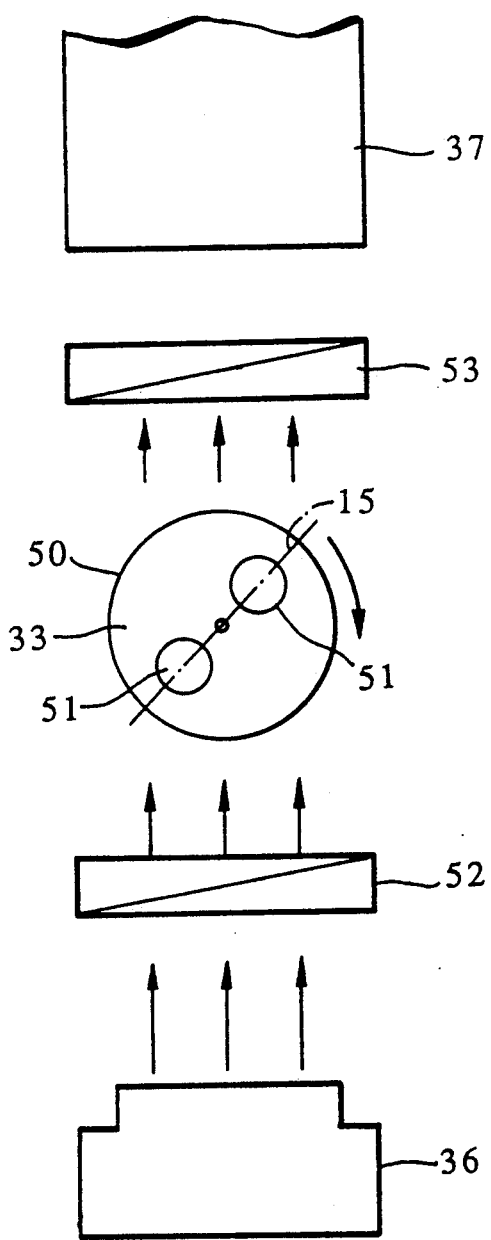
FIG. 27 is schematic structural drawing for explaining the third preferred embodiment of the present invention.

In order to align the stress applying parts 51 of this type of optical fiber 50, as is shown in FIG. 27, a polarizer 52 is placed between the optical fibers 50 and the light source 36 and a polarizer 53 is placed between the optical fibers 50 and the TV camera 37, both in a perpendicular Nicol orientation. Thus, the light from light source 36 passes through polarizer 52 and the resulting linearly polarized light is caused to be incident on one side of the optical fiber 50, after which, the image of the incident linearly polarized light which penetrates the optical fiber 50 is captured by TV camera 37 after first passing through a second polarizer 53. Otherwise, the stress applying parts 51 of optical fiber 50 are aligned just as in the second preferred embodiment, that is, based on the variation in the intensity of peak P1 and the difference between P2 and P3 on rotation of the optical fiber 50.

For the above mentioned polarizers 52, 53, calcite and other materials with a crystalline structure possessing directional properties as well as polarizers formed from composite resins and the like may be employed.

In this way, the light from light source 36 passes through polarizer 52 and is there converted into linearly polarized light. While passing through optical fiber 50, the plane of polarization of this linearly polarized light is caused to rotate somewhat the in the stress applying parts 51. This phenomena is a result in the difference between the coefficient of thermal expansion of the stress applying parts 51 and that of the cladding 54.

The image of the incident linearly polarized light which penetrates the optical fiber 50 is captured by TV camera 37 after first passing through the second polarizer 53. Because the transmitted light passes through the second polarizer 53 prior to entering TV camera 37, rotation conversion of the polarized wave plane can be detected with high sensitivity. Thus, by employing such a method, the variation in the intensity of peak P1 and the difference between P2 and P2 becomes greater, whereby it becomes possible to align the position of the stress applying parts 51 of the optical fiber 50 with much greater accuracy. Thus, even for optical fibers 50 having a stress applying part-cladding refractive index difference of in the range of $-0.2\% > \Delta > 0\%$, the alignment of the position of the stress applying parts 51 can be reliably carried out.

Furthermore, by use of the method of the present embodiment, even if the index of refraction of the stress applying parts 51 is practically equal to that of the cladding 54, alignment of the stress applying parts 51 can be accomplished. The reason being that residual stress always exists in the stress applying parts 51 which tends to exert an internal contracting force, whereby due to the effect of photo-optic elastic properties, minute variations in the index of refraction of the stress applying parts 51 arise.

Such a method utilizing polarized light in order to align the stress applying parts 51 may be simply implemented using the alignment apparatus shown in FIG. 16. That is, the alignment apparatus shown in FIG. 16 may be employed in the present method by providing a polarizer 52 between the light source 36 and the approximation device 34, and by providing a second polarizer 53 between the approximation device 34 and TV camera 37. Then, after a pair of component optical fibers 50 from which the protective coating has been removed from a portion of each are each fixed in a respective pair of rotation devices, rotation devices 35a, 35d or rotation devices 35b, 35c, and the exposed portions of the two optical fibers 50 are located between the pair of lateral force applying blocks 39, the exposed sections are then illuminated from below by halogen lamp light source 36 located beneath the pair of lateral force applying blocks 39 via polarizer 52. The image of the light transmitted through the optical fibers 30 is then captured by the TV camera 37 located above the pair of lateral force applying blocks 39 after passing through polarizer 53.

Then, just as in the second preferred embodiment, while the image signal from TV camera 37 is sent to control unit 38, the pulse motors 47 are controlled to rotate at low velocity. Again as in the second preferred embodiment, this control is based on the intensity of peak P1 and the difference between P2 and P3 in the portions of the obtained image corresponding to each of the component optical fibers 50. In this way, when each of the component optical fibers 30 are judged to be at $\theta = 90°$, that is, at the point where P1 is at its lowest value and where P2-P3 equals zero, the rotation of the optical fibers 50 is stopped, after which the pulse motors 43 are controlled to rotate so that the lateral force applying blocks 39 approach one another. Afterwards, the contacting, aligned component optical fibers 50 are temporarily fixed, after which the fusing-elongation process is carried out. Both the temporary fixing and the fusing-elongation process are identical to those of the first and second preferred embodiments of the present invention.

To reiterate, in this third preferred embodiment of the present invention, a manufacturing method for polarization maintaining optical fiber couplers is provided, wherein, using the alignment apparatus employed in the first and section preferred embodiments as shown in FIG. 16, by providing the simple modifications. That is, by locating a polarizer 52 between the optical fibers 50 and the light source 36 and a polarizer 53 between the optical fibers 50 and the TV camera 37, both in a perpendicular Nicol orientation, whereby the light from light source 36 passes through polarizer 52 and the resulting linearly polarized light is caused to be incident on one side of the optical fiber 50, after which, the image of the incident linearly polarized light which penetrates the optical fiber 50 is captured by TV camera 37 after first passing through a second polarizer 53, it becomes possible to align the stress applying parts 51 of two component optical fibers 50 having a stress applying part-cladding refractive index difference ($\Delta$) of in the range of $-0.2\% < \Delta < 0\%$ with high accuracy, using the same method as in the second preferred embodiment, that is, based on the variation in the intensity of peak P1 and the difference between P2 and P3 on rotation of the optical fiber 50. It is of course also possible to employ polarization maintaining optical fibers having a stress applying part-cladding refractive index difference of in the range of $-0.8\% < \Delta < 0.2\%$ with the method of the present example. In this way, a highly efficient polarization maintaining optical fiber coupler having low optical losses can be manufactured utilizing the component optical fibers 50.

Third Experimental Example

Using polarization maintaining optical fiber material having a protective coating external diameter of 250 $\mu$m, a cladding diameter of 80 $\mu$m, a core diameter of 4 $\mu$m, stress applying parts having a diameter of 20 $\mu$m, a stress applying part-cladding refractive index difference of $-0.1\%$, and a cross-talk of 45 dB/5 m, the protective coating was removed from a section of each of two such component optical fibers. The exposed portions of the two component optical fibers were then placed between the lateral force applying blocks of an alignment apparatus such as that shown in FIG. 16.

Figure 25:
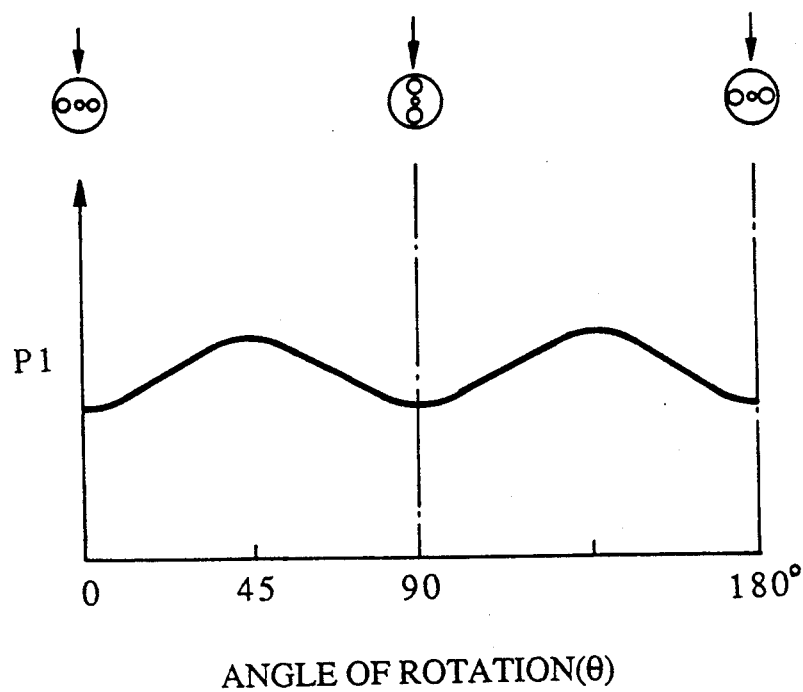
FIG. 25 is a graph showing the relationship between the angle of rotation and height of the tallest peak in the light intensity distribution profiles obtained while rotating a single polarization maintaining optical fiber used in the third preferred embodiment of the present invention about its longitudinal axis.
Figure 26:
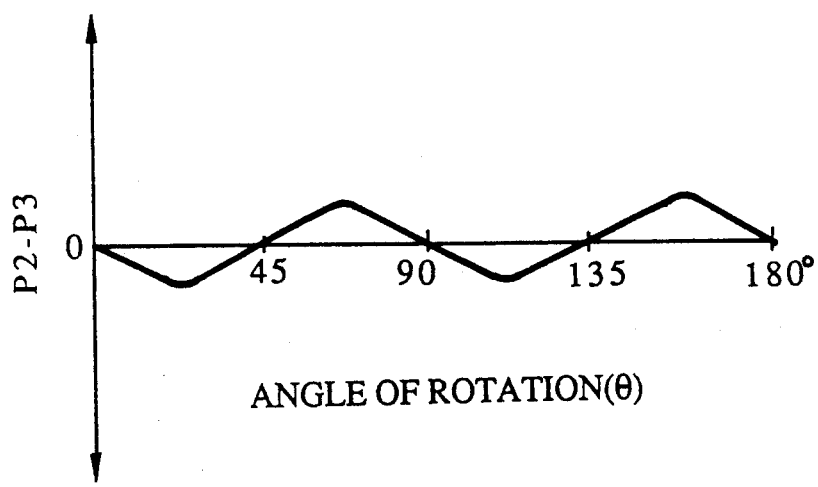
FIG. 26 is a graph showing the relationship between the angle of rotation and difference height of the in the two lowest troughs in the light intensity distribution profiles obtained while rotating a single polarization maintaining optical fiber used in the third preferred embodiment of the present invention about its longitudinal axis.

Next, the variation in the intensity of peak P1 and the difference between P2 and P3 on rotation of the optical fibers was measured which was found to be consistent with the low amplitude variation shown in FIGS. 24 and 25 for each component optical fiber.

Next, a polarizer was placed between the optical fibers and the light source and a second polarizer was placed between the optical fibers and the TV camera, both in a perpendicular Nicol orientation. Again, the variation in the intensity of peak P1 and the difference between P2 and P3 on rotation of the optical fibers was measured which was found to be significantly increased compared with that obtained with out the polarizers, and generally the same as that shown in FIGS. 22 and 23.

Based on this variation in the intensity of peak P1 and the difference between P2 and P3 on rotation of the optical fibers with the polarizers in place, alignment of the stress applying parts of the component optical fibers was carried out, after which the pulse motors 43 were controlled to rotate so that the lateral force applying blocks approached one another. Afterwards, the contacting, aligned component optical fibers were temporarily fixed, after which the fusing-elongation process was carried out, just as in the first and second preferred embodiments of the present invention, whereby an optical fiber coupler was manufactured.

On measurement of the optical characteristics of the polarization maintaining optical fiber coupler obtained above, it was found that excess losses were 0.2 dB and cross-talk was $-36$ dB. From this it could be understood the stress applying parts were aligned within a tolerance of less than one degree.

With the manufacturing method of the present invention, it is obvious that a multitude of variations are possible. For example, while in the preferred embodiments described here, the drive means for the approximation device of the alignment apparatus were pulse motors, hydraulic means and the like can be employed instead and still be consistent with the manufacturing method of the present invention. Accordingly, the preferred embodiments presented here should be considered as examples and not as limitations. It should be understood that the optical fiber coupler of the present invention includes all forms encompassed by the appended claims.

What is claimed is:

1. A manufacturing method for a polarization maintaining optical fiber coupler comprising: a first step in which a portion of two polarization maintaining optical fibers are positioned so that stress applying parts of each are mutually aligned with respect to one another, and a second step in which a portion of said polarization maintaining optical fibers so aligned and held tightly in the alignment are subjected to a fusing-elongation process, wherein said first step comprises using an image sensor, examining the light intensity distribution profile of an image obtained from the image sensor of light transmitted through said polarization maintaining optical fibers from a light source, and based on said examining, rotating said polarization maintaining optical fibers about longitudinal axes thereof to carry out said mutual alignment of said stress applying parts of said polarization maintaining optical fibers.

2. A manufacturing method for a polarization maintaining optical fiber coupler in accordance with claim 1, wherein said first step further comprises bringing said light intensity distribution profile into conformity with a polarization maintaining optical fiber light intensity distribution profile previously measured at a predetermined angle.

3. A manufacturing method for a polarization maintaining optical fiber coupler in accordance with claim 1, wherein said first step further comprises measuring the change in the intensity of the maximum light intensity in said light intensity distribution profile to measure the position of said stress applying parts.

4. A manufacturing method for a polarization maintaining optical fiber coupler in accordance with claim 1, wherein said first step further comprises measuring the change in the intensity of both the maximum light intensity in said light intensity distribution profile and minimum light intensity in said light intensity distribution profile to measure the position of said stress applying parts.

5. A manufacturing method for a polarization maintaining optical fiber coupler in accordance with claim 2 or 3, wherein said polarization maintaining optical fibers have a stress applying part-cladding refractive index difference from $-0.2\%$ to $-0.8\%$.

6. A manufacturing method for a polarization maintaining optical fiber coupler in accordance with claim 2 or 3, wherein a first polarizer is provided between said light source and said polarization maintaining optical fibers and a second polarizer is provided between said polarization maintaining optical fibers and said image sensor, wherein said first polarizer effects linearly polarized light to be incident on said polarization maintaining optical fibers, and said linearly polarized light is incident on said image sensor after being transmitted through said polarization maintaining optical fibers and said second polarizer.

7. A manufacturing method for a polarization maintaining optical fiber coupler in accordance with claim 6, wherein said polarization maintaining optical fibers have a stress applying part-cladding refractive index difference $\Delta$ such that $-0.8\% < \Delta < 0\%$.

8. A manufacturing method for a polarization maintaining optical fiber coupler in accordance with claim 1, 2, 3 or 4, wherein said image sensor is a TV camera.

9. A manufacturing method for a polarization maintaining optical fiber coupler in accordance with claim 7, wherein said image sensor is a TV camera.

* * * * *